United States Patent
Ghionis

(10) Patent No.: US 8,905,562 B1
(45) Date of Patent: Dec. 9, 2014

(54) PHOTOGRAPHIC LIGHT

(71) Applicant: Jerry Ghionis, Beverly Hills, CA (US)

(72) Inventor: Jerry Ghionis, Beverly Hills, CA (US)

(73) Assignee: Jerry Ghionis Photography, Inc., Beverly Hills, CA (US)

( * ) Notice: Subject to any disclaimer, the term of this patent is extended or adjusted under 35 U.S.C. 154(b) by 0 days.

(21) Appl. No.: 13/855,976

(22) Filed: Apr. 3, 2013

Related U.S. Application Data

(60) Provisional application No. 61/620,046, filed on Apr. 4, 2012.

(51) Int. Cl.
  *G03B 15/02* (2006.01)
  *F21L 4/02* (2006.01)
  *G03B 15/06* (2006.01)

(52) U.S. Cl.
  CPC .................... *G03B 15/06* (2013.01)
  USPC ............. 362/16; 362/184; 362/190; 362/355; 362/361; 362/410

(58) Field of Classification Search
  CPC ........ G03B 15/02; G03B 15/06; G03B 15/07; G03B 21/20; G03B 2215/0567; G03B 2215/0571; G03B 21/0004; F21Y 2101/02; F21Y 2105/001; F21Y 2103/003; F21W 2131/406; F21L 4/02; F21L 11/00; F21V 23/04; F21V 23/0414; F21K 9/00; F21K 9/30
  USPC ........... 362/3, 8, 9, 11, 16, 17, 109, 114, 184, 362/186, 190, 191, 196, 202, 205, 208, 235, 362/249.01, 249.02, 249.05, 311.02, 351, 362/353, 355, 356, 360, 361, 410, 414, 418, 362/431
  See application file for complete search history.

(56) References Cited

U.S. PATENT DOCUMENTS

| | | | |
|---|---|---|---|
| 6,942,368 B1 * | 9/2005 | Kane et al. | 362/457 |
| 2010/0019690 A1 * | 1/2010 | Libohova et al. | 315/294 |
| 2010/0060197 A1 * | 3/2010 | Duerr | 315/294 |
| 2011/0216521 A1 * | 9/2011 | Howe | 362/34 |

* cited by examiner

*Primary Examiner* — Thomas M Sember
(74) *Attorney, Agent, or Firm* — Emch, Schaffer, Schaub & Porcello Co., L.P.A.

(57) ABSTRACT

The present invention is directed to a light that can be used to illuminate a subject for a photographic or video capture. The light is designed to be easily transportable and to provide a bright but diffused illumination of the subject.

12 Claims, 3 Drawing Sheets

PHOTOGRAPHIC LIGHT

CROSS REFERENCE TO RELATED APPLICATIONS

This application claims the benefit of U.S. provisional patent application Ser. No. 61/620,046 filed Apr. 4, 2012.

BACKGROUND OF THE INVENTION

The invention is directed to a light that can be used with photographic or video cameras to illuminate a subject. Such a light is desirable because the ambient light that is available to illuminate a subject is frequently not adequate or does not produce the light characteristics that are desired by the individual capturing the image. In the past, large light sources were utilized to provide additional illumination. Such large light sources were heavy and needed to be mounted on heavy light stands. The size and weight of the prior photographic lights made it difficult to transport and set up such light units. These large lights produced a great deal of heat and a very harsh illumination for the subject. These prior lights frequently required additional accessories to diffuse the light to produce the illumination characteristics desired by the image taker. These prior photographic lights provided a very flat light that frequently produced shadows on the subject that compromised the quality of the image capture. It is the object of the present invention to provide a light that overcomes the deficiencies of the prior art light sources.

SUMMARY OF THE INVENTION

The present invention is directed to a light that can be used to illuminate a subject for photographic or video capture. The light is designed to be easily transportable and to provide a bright but diffused illumination of the subject.

The light of the present invention is designed so that it can be easily hand held or easily mounted on other holding structures such as a light stand. The hand held ability of the light 10 allows the user to capture an image where the light can be held and used in tandem with the camera. The light produces a perfect daylight color of approximately 5400° K. with a variation of plus or minus approximately 100° K. The light 10 is designed to be very compact, but at the same time extremely powerful. The 15 watts of power available for the light generates 150 equivalent watts of daylight power. The light incorporates the latest technology heat boards (such as Metal Core Printed Circuit Board) for the LED lights which allow the LED lights to be placed closer together in a more compact area. The heat boards function to manage the heat produced by the LED lights allowing the LED lights to be positioned in close proximity to one another in a manner that has not previously been possible in lights that are used in photographic or video image capture. The close proximity of the LED lights also functions to greatly reduce shadows as the illumination from the light is very evenly distributed and powerful.

The close proximity of the LED lights essentially eliminates shadows in the light that is used to illuminate a subject. In prior art devices using LED lights, there are frequently shadows where the light produced by one LED stops and the light from the next LED begins. This difficulty with shadows was further magnified by the fact that the LED lights in prior devices had to be spaced widely apart to manage the heat produced by the LED lights. The arrangement of the LED lights in the current invention eliminates these difficulties and produces an essentially shadow free illumination of a subject.

The preferable LED lights are flicker free allowing the light 10 to be used in both photo and video applications. The rounded shape provides for a wide angle of light illumination, over 72°. This is much greater than prior lights which are normally limited to about a 50° angle of illumination. The more than 72° of illumination provides for very effective lighting of the subject. The full lighting can even be achieved when the subject is at relatively close distances to the camera. The power provided to the LED lights is also dimmable from approximately 1.5 watts to approximately 15 watts. The changing or dimming of the power output has a commensurate dimming or changing of the light output from the LED lights. This change in the output of the LED lights is accomplished with virtually no color shift, less than 100°, which is considerably less than can be achieved with most other LED light sources. The power or illumination changes can be made on a continuous basis to achieve a desired power output from about 1.5 watts to about 15 watts or the power output or illumination can be changed in a step fashion where the changes takes place in preset steps.

Gel clips are also provided with the light which allow for the placement of virtually any style gel over the diffusion front of the light. Thus the illumination from the light can be varied and modified depending on the preferences and/or needs of the user.

Other objects and advantages of the present invention will become apparent to those skilled in the art upon a review of the following detailed description of the preferred embodiments and the accompanying drawings.

DETAILED DESCRIPTION OF THE PREFERRED EMBODIMENT(S)

The invention is directed to a light source that can be used to illuminate a subject. More particularly, the light can be used for photographic or video applications. The light is very compact and provides a soft and evenly lit source of illumination. Other features and advantages of the light will be more completely understood by reference to the accompanying drawings in connection with the following description.

Figure 1:
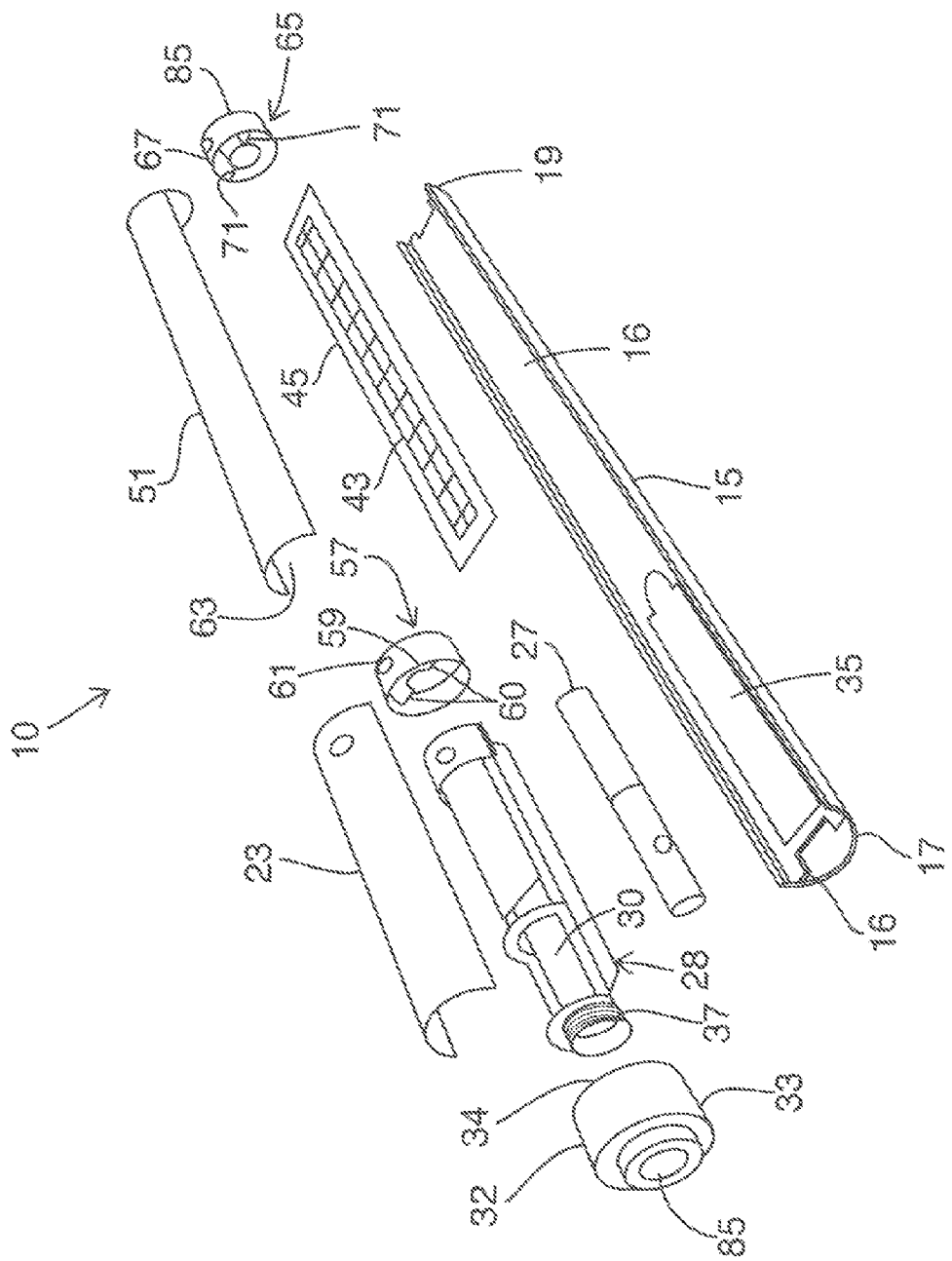
FIG. 1 is an exploded perspective view of the light of the present invention.
Figure 2:
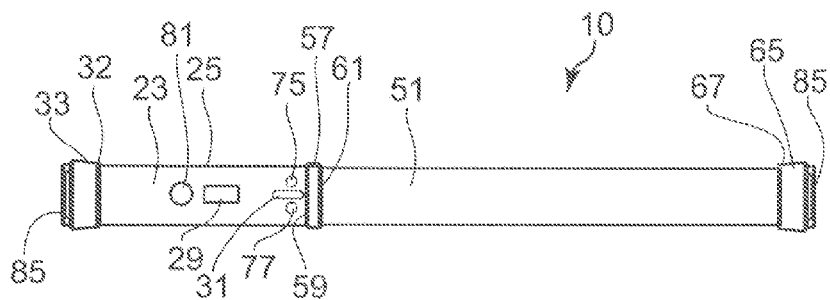
FIG. 2 is a top view of the present invention.
Figure 3:
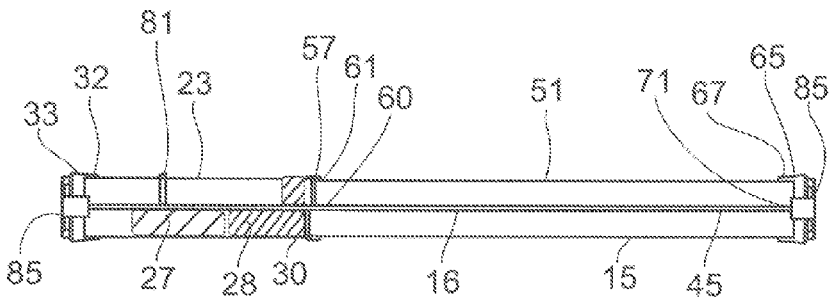
FIG. 3 is a side elevational cross sectional view taken along line A-A in FIG. 2.
Figure 4:
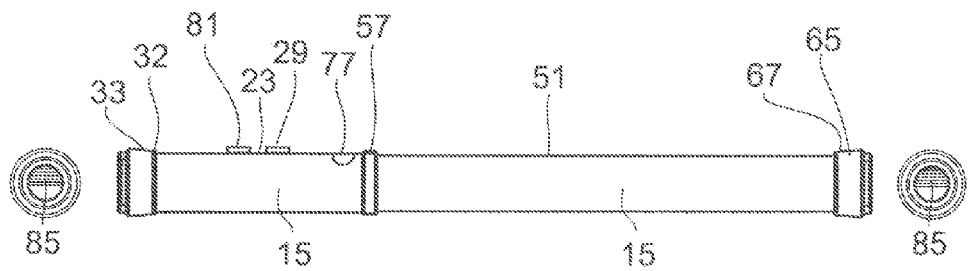
FIG. 4 is a side elevational view.
Figure 5:
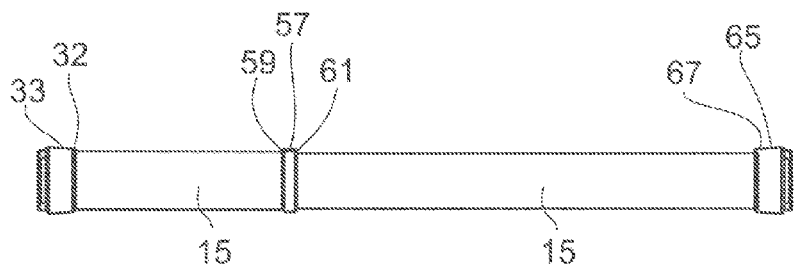
FIG. 5 is a bottom view.
Figure 6:
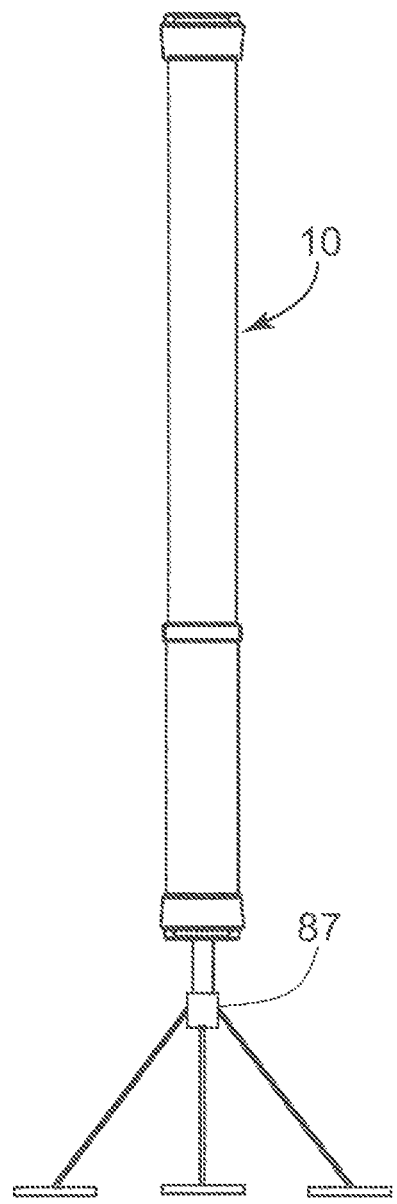
FIG. 6 is a side elevational view of the light mounted on a stand.

The light 10, as shown in FIGS. 1-6, is particularly well suited for use as a photographic or video light that illuminates a subject. The light 10 has an opaque housing 15 that has a first end 17 and a second end 19. A wall 16 extends along the length of the opaque housing 15 from the first end to the second end 19. An opaque cover 23 is secured to the opaque housing 15 and extends from the first end 17 of the housing 15 in a direction towards the second end 19. The opaque cover 23 and the opaque housing 15 form a handle 25 for the light 10. The opaque housing 15 and the opaque cover 23 are substantially semi-cylindrical in shape and form a substantially cylindrical handle 25 on the light. A battery 27 is positioned in the handle 25 and operatively connected to an on/off switch 29 that is positioned in the opaque cover 23 of the handle 25. A battery level indicator 31 is positioned on the handle 25 and provides information on the charge level for the battery. The battery 27 is contained in a carrier unit 28 which has a compartment 30 for holding the battery 27. The carrier unit 28 is positioned in a cavity 35 in the wall 16 of the opaque housing 15. The cavity 35 functions to securely position the carrier unit 28 in the opaque housing 15. The end of the carrier unit 28 that is adjacent to the first end 17 of the opaque housing 15 has a threaded boss 37 that extends from the first end 17 of the opaque housing 15. An end cap 33 having a threaded opening 34 is positioned on the first end 17 of the opaque housing 15. The end cap 33 has a circular projection 32 that is designed to extend over the outer surface of the opaque housing 15 and the opaque cover 23. The threaded opening 34 in the end cap 33 is designed to threadingly engage the threaded boss 37 on the carrier unit 28. The end cap 33 when secured on the threaded boss 37 functions to secure the opaque cover 23 on the opaque housing 15 on the first end of the light 10.

A plurality of LED lights 43 are positioned on a (PCB) Printed Circuit Board 45. The PCB 45 is positioned on the wall 16 that extends along the open side of the opaque housing 15. The PCB 45 is positioned on the wall 16 in a manner so that the plurality of LED lights 43 is spaced apart from the wall 16. The plurality of LED lights 43 are disposed so that light from the LED lights is directed away from the opaque housing 15. The PCB 45 is operatively connected to the on/off switch 29 on the handle 25. A translucent diffusion panel 51 is positioned on the portion of the opaque housing 15 that extends from the opaque cover 23 to the second end 19 of the opaque housing 15. The translucent diffusion panel 51 is disposed to cover the plurality of LED lights 43 positioned on the wall 16. The translucent diffusion panel 51 is made of a material such as a frosted plastic that will diffuse the light from the plurality of LED lights.

A bracket 57 is positioned on the opaque housing 15 and defines a first flange 59 that extends over the end of the opaque cover 23 that is spaced apart from the first end cap 33. The first flange 59 of the bracket 57 is disposed to hold the opaque cover 23 in position on the opaque housing 15. When the opaque cover 23 is in the desired position the opaque cover 23 and the opaque housing 15 form an enclosed structure that forms the handle 25 on the light 10. The bracket 57 has a second flange 61 that is designed to extend over the end of the translucent diffusion panel 51 that is adjacent the opaque cover 23. The second flange 61 functions to hold the translucent diffusion panel 51 in position on the opaque housing 15 whereby an enclosed space 63 is formed between the translucent diffusion panel 51 and the opaque housing 15. The enclosed space 63 is the area where the plurality of LED lights 43 are positioned. A protrusion 60 is positioned on each side of the bracket 57. The protrusions are disposed to position the PCB 45 in the desired location on the wall 16 in the opaque housing 15.

A second end cap 65 is positioned on the second end 19 of the opaque housing 15. The second end cap 65 defines a generally circular flange 67 that extends over the second end 19 of the opaque housing 15 and over the end of the translucent diffusion panel 51 that is adjacent to the second end of the opaque housing 15. The second end cap 65 fits over the end of the opaque housing 15 and the translucent diffusion panel 51 with an interference fit that functions to hold the translucent diffusion panel in position with respect to the opaque housing 15. A tab 71 is positioned on each side of the second end cap 65 and the tabs are disposed to engage the end of the PCB 45 that is adjacent the second end 19 of the opaque housing 15. The tab 71 acts to hold the PCB 45 on the wall 16 of the opaque housing 15. In this manner, the protrusions 60 on the bracket 57 and the tabs 71 on the second end cap 65 function to hold the PCB 45 and the plurality of LED lights 43 in position with respect to the opaque housing 15 and the translucent diffusion panel 51.

A first illumination switch 75 and a second illumination switch 77 are positioned on the handle 25 in the general vicinity of the on/off switch 29. The first and second illumination switches are electronically connected to the PCB 45 and the plurality of LED lights 43. The first illumination switch 75 can be operated to increase the light output of the plurality of LED lights 43 in a manner to allow for changes in the intensity of the LED lights from the lowest light output to the highest light output in a continuous fashion. The second illumination switch 77 is constructed to decrease the intensity of plurality LED lights 43 whereby the intensity of the light is controlled from the lowest light output to the highest light output. The first and second illumination switches will vary the intensity of the illumination in a continuous manner if the switches are held in the operational position. The first and second illumination switches will vary the intensity of the illumination in steps if the switches are pressed and then released. An AC connector 81 is positioned on the handle 25 for providing a connection to a source of normal alternating current power that can be used to charge the battery 27 and also be used as a source of electrical power for illuminating the plurality of LED lights 43. The first and second end caps 33, 65 each have a threaded aperture 85 located on the end of the first and second end caps that are spaced apart from the first and second ends of the opaque housing 15. The threaded apertures 85 are disposed to allow the light 10 to be mounted on a light stand or tripod 87 for supporting the light in a desired positioned. The light of the present invention is designed so that it can be easily hand held or easily mounted on other holding structures such as a light stand. The hand held ability of the light 10 allows the user to capture an image where the light can be held and used in tandem with the camera. The light produces a perfect daylight color of approximately 5400° K. with a variation of plus or minus approximately 100° K. The light 10 is designed to be very compact, but at the same time extremely powerful. The 15 watts of power available for the light generates 150 equivalent watts of daylight power. The light incorporates the latest technology heat boards for the LED lights which allow the LED lights to be placed closer together in a more compact area. The heat boards function to manage the heat produced by the LED lights so that the LED lights can be positioned in close proximity to one another in a manner that has not previously been possible in lights that are used in photographic or video image capture. The close proximity of the LED lights also functions to greatly reduce shadows as the illumination from the light is very evenly distributed and powerful. The light can be operated on AC or DC current which increases the flexibility for the uses of the light. The primary energy source is DC battery 27 contained in the handle 25 of the light 10. There is also, however, a plug 81 that allows the light to be connected to a normal AC receptacle whereby the AC power can be used to power the light 10 or to recharge the battery 27 in the handle 25. The battery 27 utilized in the light are lithium ion batteries with an extremely high energy output and quick recharging times.

The rounded shape of the light combined with the custom frosted diffusion panel 51 provides a soft and evenly lit light source. The translucent diffusion panel 15 projects soft even light which is not normally associated with LED lights. LED lights used in prior lights tend to be very harsh and require additional diffusion to obtain the desired illumination of the subject. The light 10 of the current invention produces perfectly diffused light and there is no need for additional accessories to further diffuse the light.

The close proximity of the LED lights essentially eliminates shadows in the light that is used to illuminate a subject. In prior art devices using LED lights, there are frequently shadows where the light produced by one LED stops and the light from the next LED begins. This difficulty with shadows was further magnified by the fact that the LED lights in prior devices had to be spaced widely apart to manage the heat produced by the LED lights. The arrangement of the LED lights in the current invention eliminates these difficulties and produces an essentially shadow free illumination of a subject. The LED lights are also flicker free and this allows the light to be used in both photo and video applications. The light is also very compact and lightweight so that it is well suited for traveling to various locations where it is desired to capture an image.

The rounded shape provides for a wide, over 72° angle of light illumination. This is much greater than prior lights which are normally limited to about a 50° angle of illumination. The more than 72° of illumination provides for very effective lighting of the subject. The full lighting can even be achieved when the subject is at relatively close distances to the camera. The power provided to the LED lights is also dimmable from approximately 1.5 watts to approximately 15 watts. The changing or dimming of the power output has a commensurate dimming or changing of the light output from the LED lights. This change in the output of the LED lights is accomplished with virtually no color shift, less than 100°, which is considerably less than can be achieved with most other LED light sources. The power or illumination changes can be made on a continuous basis to achieve a desired power output from about 1.5 watts to about 15 watts or the power output or illumination can be changed in a step fashion where the changes takes place in preset steps. Gel clips are also provided with the light which allow for the placement of virtually any style gel over the diffusion front of the light. Thus the illumination from the light can be varied and modified depending on the preferences and/or needs of the user.

In operation, the light 10 is positioned so that the translucent diffusion panel 51 is positioned to face the subject that is to be illuminated. The light 10 can be held by the handle 25 or the threaded apertures 85 on the first and second end caps 33, 65 can be utilized to mount the light on a light stand or tripod 87. The on/off switch 29 is activated to the on position, which furnishes power from the battery 27 or the AC connector 81 to the PCB 45 upon which the plurality of LED lights 43 are mounted. The power that is supplied to the PCB 45 activates the plurality of LED lights 43 and the illumination provided by the plurality of LED lights 43 passes through the translucent diffusion panel 51. The translucent diffusion panel 51 projects a soft even light on the subject that is placed in front of the translucent diffusion panel. The power that is supplied to PCB 45 can be increased by using the first illumination switch 75 which allows for increases in the energy until the desired illumination from the plurality of LED lights 43 is produced. The power to the PCB 45 can also be decreased by using the second illumination switch 77 which provides for decreases in the power that is supplied to the PCB 45 and the plurality of LED lights 43. If there is a need to further modify the illumination that is provided through the translucent diffusion panel 51 various gels can be attached using gel clips.

The above detailed description of the present invention is given for explanatory purposes. It will be apparent to those skilled in the art that numerous changes and modifications can be made without departing from the scope of the invention. Accordingly, the whole of the foregoing description is to be construed in an illustrative and not a limitative sense, the scope of the invention being defined solely by the appended claims.

I claim:

1. A photographic light for illuminating a subject comprising:
    a semi-cylindrical housing having a first end and a second end, the housing defining an opening;
    a plurality of LED lights positioned in the housing; the plurality of LED lights being disposed to direct light in a direction towards the opening in the housing and towards the subject;
    a semi-cylindrical diffusion panel positioned on the side of the housing that faces the subject; the diffusion panel closing at least a portion of the opening in the housing; and
    a semi-cylindrical opaque panel positioned on the housing and closing the portion of the opening not closed by the diffusion panel.

2. The light of claim 1 wherein the semi-cylindrical housing and opaque panel form a handle for holding the light 3. The light of claim 2 wherein an end cap is positioned on each end of housing, the end caps securing the semi-cylindrical diffusion and opaque panels to the housing, the end caps having a threaded aperture for securing the light to a stand.

4. The light of claim 1 wherein a switch is provided controlling the light output of the plurality of LED lights that illuminates the subject.

5. The light of claim 2 wherein a battery is provided in the handle for operating the LED lights.

6. The light of claim 2 wherein an electrical plug is provided in the handle for powering the light from a power source.

7. The light of claim 2 wherein the light output is between 5300° K. and 5500° K.

8. The light of claim 7 wherein the light output is 5400° K.

9. The light of claim 1 wherein the plurality of LED lights are disposed on a printed circuit board having a base metal for heat diffusion.

10. The light of claim 1 wherein the diffusion panel provides a 72° angle of illumination for the subject.

11. The light of claim 1 wherein a wall is positioned in the housing, adjacent the opening, the LED lights being mounted on the wall.

12. The light of claim 1 wherein the output of the LED lights is variable between 1.5 watts and 15 watts with less than 100° K. color shift.

\* \* \* \* \*